(12) United States Patent
Syrett

(10) Patent No.: US 8,352,308 B1
(45) Date of Patent: *Jan. 8, 2013

(54) ASSESSING VALUE ADDED BY ASSOCIATING AN ENTITY WITH A PROJECT

(75) Inventor: Matthew Syrett, Los Angeles, CA (US)

(73) Assignee: IMDb.com, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,851

(22) Filed: Jun. 26, 2012

Related U.S. Application Data

(63) Continuation of application No. 12/822,840, filed on Jun. 24, 2010, now Pat. No. 8,209,215.

(51) Int. Cl.
G06Q 10/00 (2006.01)
(52) U.S. Cl. .................. 705/7.29; 705/7.31; 705/7.39
(58) Field of Classification Search ............... 705/7.29, 705/7.31, 7.39
See application file for complete search history.

(56) References Cited

U.S. PATENT DOCUMENTS

| | | | |
|---|---|---|---|
| 8,095,415 B1 * | 1/2012 | Thomas et al. | 705/7.39 |
| 2006/0235783 A1 * | 10/2006 | Ryles et al. | 705/35 |

OTHER PUBLICATIONS

Andrew Ainslie, et al. "Modeling Movie Life Cycles and Market Share", Marketing Science vol. 2 .. ,No. 3, Summer 2005, pp. 50S-'i17.*
Byeng-Hee Chang, et al. "Devising a Practical Model for Predicting Theatrical Movie Success: Focusing on the Experience Good Property", Journal of Media Economics, 18(4), 247-269 (2005).*
Anita Elberse, "The Power of Stars: Do Star Actors Drive the Success of Movies?", Journal of Marketing vol. 71 (Oct. 2007), 102-120.*
Ainslie, Andrew et al., "Modeling Movie Life Cycles and Market Share," Marketing Science, vol. 2, No. 3, Summer 2005, pp: 50S-'i17.
Chang, Byeng-Hee, et al., "Devising a Practical Model for Predicting Theatrical Movie Success: Focusing on the Experience Good Property," Journal of Media Economics, vol. 18, No. 4, (2205) pp: 247-269.
Elberse, Anita, "The Power of Stars: Do Star Actors Drive the Success of Movies?," Journal of Marketing, vol. 71, (Oct. 2007), pp: 102-120.
FORBES.COM, LLC, "The Celebrity 100 —Forbes.com," 2010, located at <http://www.forbes.com/lists/2009/53/celebrity-09_The-Celebrity-100_Rank.html>, last accessed on Dec. 9, 2010, 2 pages.
IMDb, Inc., "Road to the Oscars 2009, STARmeter™ Top 25 for 2008," 1990-2009, located at <http://www.imdb.com/features/rto/2009/starmeter>, last accessed on Dec. 9, 2010, 4 pages.
The Ulmer Scale, "The Ulmer Scale, You can bank on it®," 1997-2010, located at <http://www.ulmerscale.com>, last accessed on Dec. 9, 2010, 2 pages.
U.S. Appl. No. 12/827,006, filed Jun. 30, 2010, for Matthew Syrett.

* cited by examiner

*Primary Examiner* — Mark A Fleischer
(74) *Attorney, Agent, or Firm* — Novak Druce + Quigg LLP

(57) ABSTRACT

When deciding whether to fund a project, such as a movie, investors consider information such as what is often referred to as the "bankability" of people or entities attached to the project, such as the top-billed actors, the director, the producer, and/or the screenwriter. A system can collect information about people or entities and prior projects associated with those people or entities and use that information to calculate the bankability of those people or entities. Project developers can use the calculated bankability of the people or entities when deciding which people or entities to attach to in-development projects to increase the chance that the project will attract funding.

20 Claims, 5 Drawing Sheets

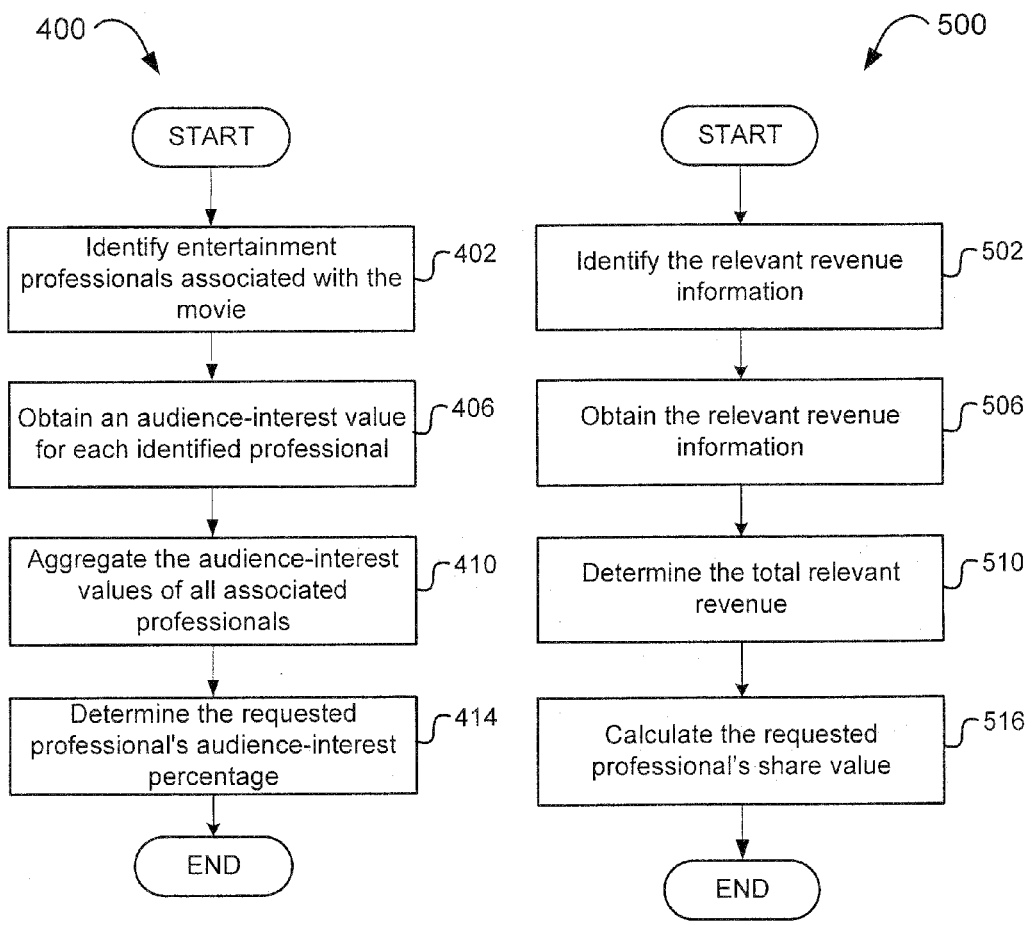

ASSESSING VALUE ADDED BY ASSOCIATING AN ENTITY WITH A PROJECT

CROSS REFERENCE TO RELATED APPLICATION

This application is a continuation of, and claims priority to, allowed U.S. patent application Ser. No. 12/822,840, filed Jun. 24, 2010, entitled "Assessing Value Added by Associating an Entity with a Project," which is hereby incorporated herein by reference for all purposes.

BACKGROUND

When attempting to raise funds or secure financial backing for projects such as motion pictures, it typically is desirable to attach at least one actor, producer, or other person or entity to the project that will increase the likelihood of investment in the project. For example, a film project progresses through multiple stages before the film is completed and distributed to audiences. Each stage of the project, from planning to completion, requires some level of funding. In an initial development stage, a filmmaker or other person involved in the project pitches the film project to potential investors to obtain funding necessary to perform various tasks, such as to write a screenplay and eventually produce and distribute the film.

When deciding whether to fund the project, investors consider information such as what is often referred to as the "bankability" of people or entities attached to the project, such as the top-billed actors, the director, the producer, and/or the screenwriter. The bankability of an actor can include, for example, an estimated or predicted ability of that actor to raise funding for a project simply by having that actor's name attached to the project, typically determined subjectively by persons in the industry. Accordingly, filmmakers attempt to identify professionals having high bankability and attach those professionals to the film project.

Because bankability is such an important factor in obtaining financing for film projects, much effort is spent in the film industry determining the bankability of actors, directors, producers, writers, and other professionals. Nevertheless, accurately and consistently determining professionals' bankability can be difficult. As mentioned above, bankability determinations are typically based, at least in part, on subjective data, which leads to inconsistent results that may not accurately reflect professionals' true bankability. In addition, bankability determinations are often made without distinguishing between older data and more recent data. That is, a professional's success on older projects is given the same weight as the professional's success on newer projects, even though recent success may be more indicative of a professional's current bankability. This failure to distinguish between older success and recent success favors a tenured professional with a long history of experience over a less-tenured professional, even if the less-tenured professional has had more success in recent years.

BRIEF DESCRIPTION OF THE DRAWINGS

Various embodiments in accordance with the present disclosure will be described with reference to the drawings, in which:

FIG. 4 provides a flow diagram illustrating an exemplary process whereby the exemplary system of FIG. 2 calculates an entertainment professional's audience-interest percentage for a movie, in accordance with at least one embodiment;

FIG. 5 provides a flow diagram illustrating an exemplary process whereby the exemplary system of FIG. 2 calculates an entertainment professional's revenue share for a movie, in accordance with at least one embodiment;

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
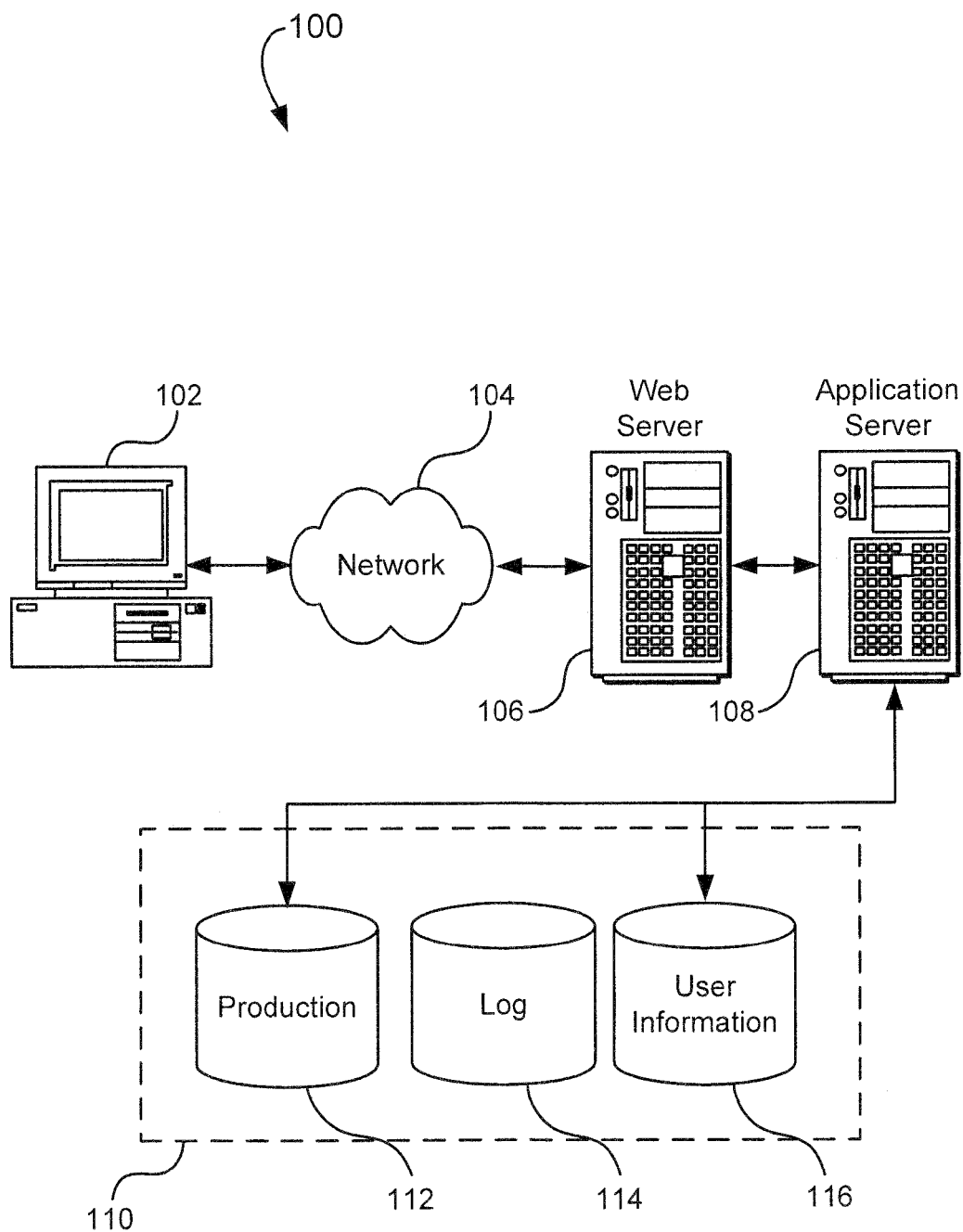
FIG. 1 is a schematic diagram illustrating an exemplary environment for implementing aspects, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details, and that variations and other aspects not explicitly disclosed herein are contemplated within the scope of the various embodiments. Furthermore, well-known features may be omitted or simplified in order not to obscure the embodiment being described.

Disclosed herein are example techniques, including systems and methods, for collecting information and using that information to calculate the bankability of entertainment professionals, such as actors, directors, writers, producers, musicians, comedians, athletes, models, and other types of performers, artists, and business people. It should be understood, however, that the examples disclosed are not exhaustive and that many other embodiments would be apparent to one of ordinary skill in the art in light of the teachings and suggestions contained herein. Further, while many examples discussed herein refer to actors and movies, it should be understood that many other types of persons or entities can be associated with many different types of projects within the scope of the various embodiments. For example, embodiments can assess value added to a project by associating the project with a well-known studio or production company, setting the project (e.g., a movie) in a desirable location, filming the project in 3-D, producing the project using a new technology, attaching to an animated character, or attaching the goodwill of an entity, such as sports team or company. Further, it should be understood that a project may be a television production, such as a television program or broadcast, a play, a concert, a tour, such as a concert tour, a sporting event or team, or other such occurrence.

It will be helpful to have a brief overview of an exemplary method for determining the bankability of a professional actor in accordance with at least one embodiment. As mentioned above, bankability as used herein generally refers to some measure of the ability of an entity to raise funding or otherwise generate some level of revenue or interest based at least in part upon the entity being associated with a project. According to this example, to calculate an actor's bankability, embodiments identify substantially all movies for which the actor was a cast member, or at least movies for which information is available. Then, for each identified movie, embodiments identify the movie's other cast members. For each cast member, including the actor in question, embodiments collect data indicative of audience interest for the cast member. Audience interest, according to some embodiments, is indicative of an actor's current popularity.

In some embodiments, audience interest for an actor is based on information such as recent Internet activity related to the actor. For example, audience interest for an actor may be determined by considering the number of recent Internet searches related to the actor. Also, for example, audience interest for an actor may be determined by considering the number of recent "hits" received by an Internet website associated with the actor.

Next, for each movie for which the actor was a cast member, the audience interest for the actor in question can be compared to the aggregated audience interest for all cast members. This comparison indicates the actor's percentage share of audience interest for the movie relative to all cast members. In particular, according to this example, an actor's percentage share of audience interest for a particular movie can be calculated by dividing the actor's audience interest by the aggregated audience interest for all cast members.

According to this example, after calculating the actor's percentage share of audience interest for a movie, the actor's revenue share for the movie is calculated. In some embodiments, an actor's revenue share for a particular movie is the amount of revenue that can be attributed to the actor's involvement in the movie. According to this example, to calculate the actor's revenue share for a particular movie, the actor's percentage share of the audience interest is multiplied by the movie's revenue. In some embodiments, a movie's revenue is the movie's total gross revenue. However, it should be appreciated that a movie's revenue could be the movie's box-office revenue, rental revenue, foreign revenue, domestic revenue, worldwide revenue, home media revenue, such as DVD, blu-ray, on-demand, download, digital copy, etc, or any combination thereof.

Further, when calculating the actor's revenue share for a particular movie, according to this example, an adjustment and/or decay can be applied to the revenue to account for lapsed time. One having ordinary skill in the art will appreciate that either the movie's revenue can be time adjusted/decayed or the actor's revenue share can be time adjusted. Accordingly, one having ordinary skill in the art will appreciate that a time-related revenue adjustment can be made either before or after calculating the actor's revenue share. For example, a movie's revenue can be time adjusted and then the actor's revenue share can be calculated based on the movie's time-adjusted revenue, or the actor's revenue share can be calculated and then the actor's revenue share can be time adjusted. Other adjustments can be applied in accordance with other embodiments, such as to account for factors such as inflation, number of screens showing the movie, adjusted ticket prices, or any other such information.

According to this example, revenue is adjusted based on the posting date of the revenue. For example, if a movie was released one year prior to determining the actor's revenue share and if the movie's revenue was posted on a weekly basis since the movie's release date, then each week's revenue is adjusted based on its posting date. For example, the first week's revenue can be adjusted to account for fifty-one weeks of lapsed time, the second week's revenue can be adjusted to account for fifty weeks of lapsed time, the third week's revenue can be adjusted to account for forty-nine weeks of lapsed time, and so on. It should be appreciated that revenue can be time adjusted based on days, weeks, months, years, or any other appropriate period of time. For example, if revenue is adjust based on years for a movie that was released ten years ago, then the year-one revenue can be adjusted to account for nine years of lapsed time, year-two revenue can be adjusted for eight years of lapsed time, and so on. Using time-adjusted revenue to determine an actor's bankability has the effect of weighting bankability toward the actor's recent movies.

It should be appreciated that, instead of adjusting revenue based on the date the revenue was posted, revenue could be adjusted based on other factors, such as the movie's release date, which could be the domestic release date, the foreign release date, the rental release date, etc. One of ordinary skill in the art will appreciate that there are any number of dates associated with a movie could be used as the relevant date for time adjusting revenue.

After the actor's decayed/adjusted revenue share has been calculated for each movie identified as being associated with the actor, the actor's decayed revenue share for all identified movies are aggregated to determine the actor's total revenue share for all movies. Then the professional's total revenue is then normalized into a bankability score that filmmakers, casting directors, etc can use directly compare the actor's bankability to other actors' bankability. For example, filmmakers can use embodiments described herein to identify which actors have sufficient bankability to attract funding for in-development projects.

Various approaches may be implemented in various environments for various applications. For example, FIG. 1 illustrates an example of an environment 100 for implementing aspects in accordance with various embodiments. As will be appreciated, although a Web-based environment may be utilized for purposes of explanation, different environments may be utilized, as appropriate, to implement various embodiments. The environment 100 includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing log data 114, which may be utilized for purposes such as reporting and analysis. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
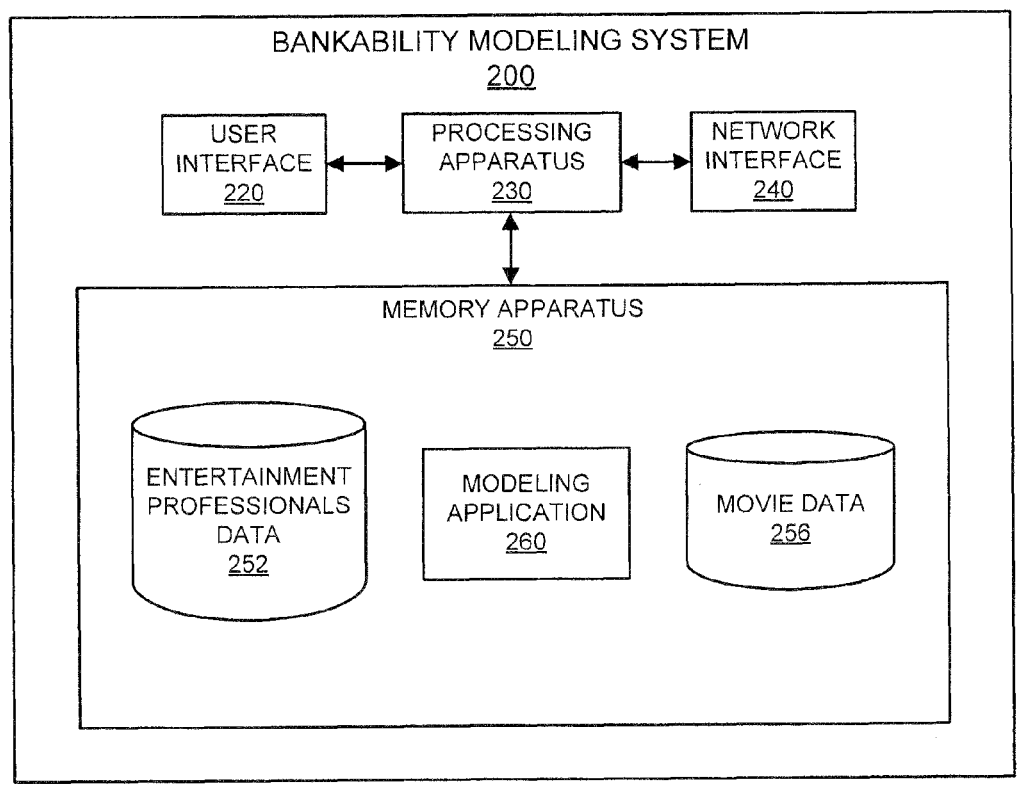
FIG. 2 is a block diagram depicting aspects of an exemplary system, in accordance with at least one embodiment.

It will be helpful to have reference to an example system configured to determine bankability in accordance with at least one embodiment. FIG. 2 provides a block diagram of one such example bankability modeling system 200. The bankability modeling system 200 comprises a user-interface apparatus 220, a network-interface apparatus 240, and a memory apparatus 250 operatively coupled to a processing apparatus 230.

As described in greater detail below, embodiments of the bankability modeling system 200 are generally configured to determine an entertainment professional's bankability by reviewing data related to movies associated with the professional. In this regard, according to at least some embodiments, the bankability modeling system 200 is owned, maintained, operated by, and/or operated on behalf of institutions that have access to a database of information related to movies, actors, and above-the-line talent, such as directors, writers, and producers. The bankability modeling system 200 may, in some embodiments, be integrated with other systems and environments, such as environment 100, of such institution and may share at least some hardware, software, and/or other resources with such other systems and environments.

It should be appreciated that the bankability modeling system 200 may be owned or maintained or operated by a third party that provides bankability information about entertainment professionals to subscribers. For example, subscribers may submit identifying information about an entertainment professional and the third party, using the bankability modeling system 200, provides the subscriber with bankability information, such as a bankability score for the entertainment professional.

As used herein, the term "apparatus" refers to a device or a combination of devices having the hardware and/or software configured to perform one or more specified functions. Therefore, an apparatus is not necessarily a single device and may, instead, include a plurality of devices that make up the apparatus. The plurality of devices may be directly coupled to one another or may be remote from one another, such as distributed over a network.

It will be understood by one of ordinary skill in the art in light of the present description that, although FIG. 2 illustrates the user interface 220, network interface 240, memory apparatus 250, and processing apparatus 230 as separate blocks in the block diagram, these separations may be merely conceptual. In other words, in some instances, the user interface 220, for example, is a separate and distinct device from the processing apparatus 230 and the memory apparatus 250 and therefore may have its own processor, memory, and software. In other instances, however, the user interface 220 is directly coupled to or integral with at least one part of the processing apparatus 230 and at least one part of the memory apparatus 250 and includes the user interface input and output hardware used by the processing apparatus 230 when the processing apparatus 230 executes user input and output software stored in the memory apparatus 250.

As will be described in greater detail below, in one embodiment, the bankability modeling system 200 is entirely contained within a user terminal, such as a personal computer or mobile terminal, while, in other embodiments, the bankability modeling system 200 includes a central computing system, one or more network servers, and one or more user terminals in communication with the central computing system via a network and the one or more network servers. FIG. 2 is intended to cover both types of configurations as well as other configurations that will be apparent to one of ordinary skill in the art in view of this disclosure.

The user interface 220 includes hardware and/or software for receiving input into the bankability modeling system 200 from a user and hardware and/or software for communicating output from the bankability modeling system 200 to a user. In some embodiments, the user interface 220 includes one or more user input devices, such as a keyboard, keypad, mouse, microphone, touch screen, touch pad, controller, and/or the like. In some embodiments, the user interface 220 includes one or more user output devices, such as a display (e.g., a monitor, liquid crystal display, one or more light emitting diodes, etc.), a speaker, a tactile output device, a printer, and/or other sensory devices that can be used to communicate information to a person.

In some embodiments, the network interface 240 is configured to receive electronic input from other devices in the network 104, including the data store 110. In some embodiments, the network interface 240 is further configured to send electronic output to other devices in a network.

The processing apparatus 230 includes circuitry used for implementing communication and logic functions of the bankability modeling system 200. For example, the processing apparatus 230 may include a digital signal processor device, a microprocessor device, and various analog-to-digital converters, digital-to-analog converters, and other support circuits. Control and signal processing functions of the bankability modeling system 200 are allocated between these devices according to their respective capabilities. The processing apparatus 230 may include functionality to operate one or more software programs based on computer-readable instructions thereof, which may be stored in the memory apparatus 250. As described in greater detail below, in one embodiment of the invention, the memory apparatus 250 includes a modeling application 260 stored therein for instructing the processing apparatus 240 to perform one or more operations of the procedures described herein and in reference to FIGS. 3-5. Some embodiments of the invention may include other computer programs stored in the memory apparatus 250.

In general, the memory apparatus 250 is communicatively coupled to the processing apparatus 230 and includes at least one non-transitory computer-readable storage medium for storing computer-readable program code and instructions, as well as datastores containing data and/or databases. More particularly, the memory apparatus 250 may include volatile memory, such as volatile Random Access Memory (RAM) including a cache area for the temporary storage of data. The memory apparatus 250 may also include non-volatile memory that can be embedded and/or may be removable. The non-volatile memory can, for example, comprise an EEPROM, flash memory, or the like. The memory apparatus 250 can store any of a number of pieces of information and data used by the bankability modeling system 200 to implement the functions of the bankability modeling system 200 described herein.

In the illustrated embodiment, the memory apparatus 250 includes data stores containing entertainment professional data 252 and movie data 256. According to some embodiments, for each individual entertainment professional, the entertainment professional data 252 includes, for example, a list of movies associated with the profession and the nature of the association, such as whether the professional was a cast member, a director, a producer, and/or a writer.

Further, according to some embodiments, for each individual entertainment professional, the entertainment professional data 252 includes an audience-interest value, which indicates the level of audience interest in a particular entertainment professional. According to some embodiments, the audience-interest value for an entertainment professional is based on Internet activity related to the entertainment professional. For example, the audience-interest value for an entertainment professional may be based on the number of Internet search queries related the entertainment professional. Also, for example, the audience-interest value for an entertainment professional may be based on the number of "hits" or "pageviews" received by a web page associated with the entertainment professional. According to some embodiments, the audience-interest value for each entertainment professional is based on the respective professional's STARmeter™ as determined on a weekly basis by IMDb.com, Inc. An entertainment professional's STARmeter™ for a given week is based on the number of "pageviews" received by a web page that is on the public IMBd.com website and that is associated with that entertainment professional.

In some embodiments, the audience-interest values provided in the entertainment professional data 252 are updated on a regular basis using recent data. Accordingly, when an audience-interest value is used to determine an entertainment professional's bankability, the bankability reflects the entertainment professional's current audience interest as determined, at least in part, on currently public awareness of and interest in the entertainment professional.

According to some embodiments, the movie data 256 includes revenue information for a plurality of movies. For example, the revenue information may include a movie's domestic, foreign, and worldwide (i.e., total) gross revenue. In some embodiments, for each movie, the revenue information is presented as daily revenue, weekend revenue, weekly revenue, yearly revenue, and all time revenue. Daily revenue provides the movie's daily revenue dating back to the movie's release date. Weekend revenue provides the movie's weekend revenue for each weekend since the movie's release date. Weekly revenue provides the movie's weekly revenue dating back to the movie's release date, monthly revenue provides the movie's monthly revenue dating back to the movie's release date, and yearly revenue provides the movie's yearly revenue dating back to the movie's release date. In some embodiments, each of the daily, weekend, weekly, monthly, and yearly revenue is divided into multiple revenue categories, such as domestic revenue, foreign revenue, worldwide revenue, domestic box-office revenue, foreign box-office revenue, worldwide box-office revenue, domestic rental revenue, foreign rental revenue, worldwide rental revenue, etc.

In some embodiments, entertainment professional data 252 and/or the movie data 256 may be received from a user via the user interface 220, or may be obtained through electronic communication with another device, which may obtain the data from external data sources via the network 104 and then stored in the memory apparatus 250.

For the sake of clarity and ease of description, the figures provided herein generally illustrate the entertainment professional data 252 and the movie data 256 as each being separate from one another. However, it will be understood that, in some embodiments, these data stores may be combined or the data described as being stored within such data stores may be further separated into additional data stores.

As further illustrated by FIG. 2 and as briefly mentioned above, the memory apparatus 250 also includes the modeling application 260. As used herein, the term "application" generally refers to computer-readable program code comprising computer-readable instructions and stored on a computer-readable storage medium, where the instructions instruct a processor to perform certain functions, such as logic functions, read and write functions, and/or the like. In this regard, the modeling application 260 includes computer-readable instructions for instructing the processing apparatus 230 and/or other devices to perform one or more of the functions described herein, such as one or more of the functions described in FIGS. 3-5.

Figure 3:
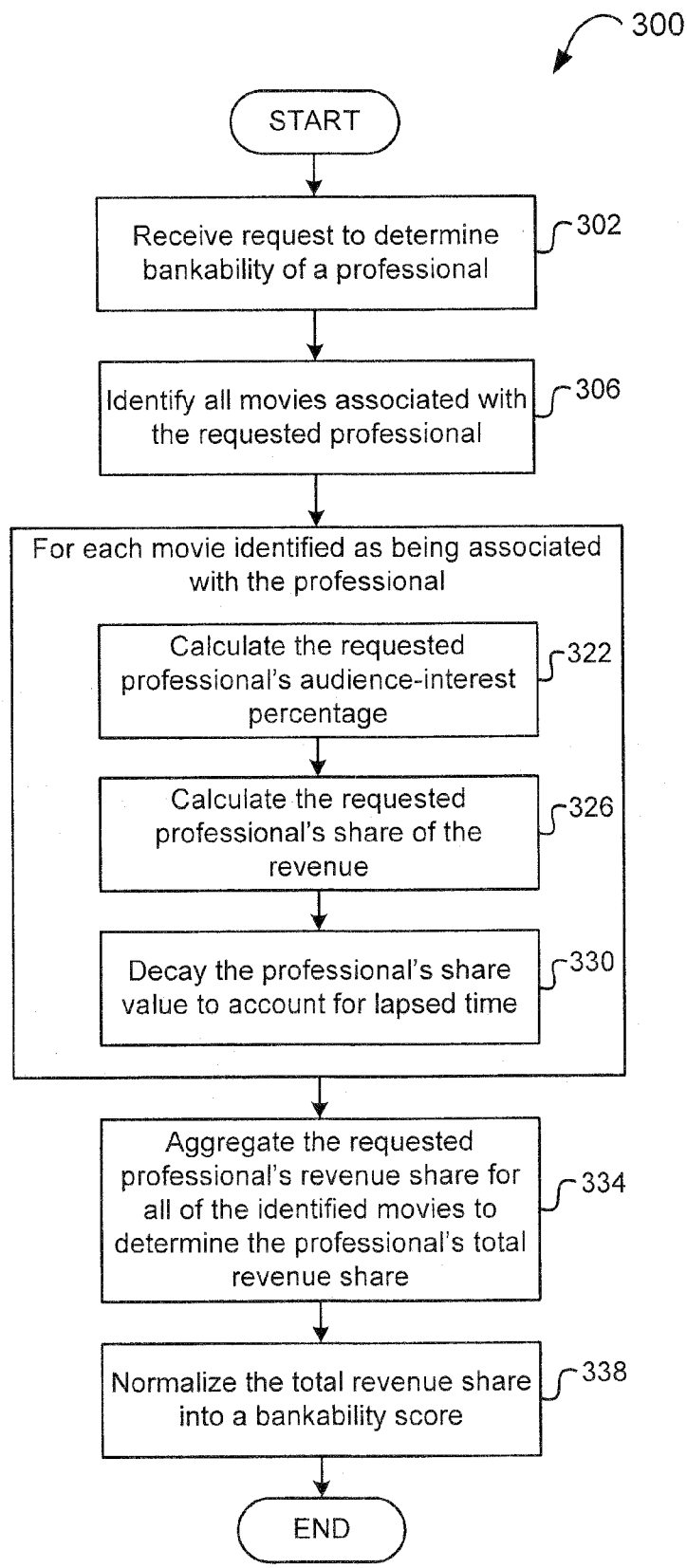
FIG. 3 provides a flow diagram illustrating an exemplary process whereby the exemplary system of FIG. 2 determines an entertainment professional's bankability, in accordance with at least one embodiment.

FIG. 3 provides a flow diagram illustrating an exemplary process 300 whereby the bankability modeling system 200 determines an entertainment professional's bankability based, at least in part, on data related to previous movies in which the professional has been involved. The process 300 generally begins with receiving a request from a user to determine a particular professional's the bankability, as indicated at block 302. According to some embodiments, the request indicates whether the user wishes to obtain the professional's bankability as an actor, director, producer, writer, etc. Further, according to some embodiments, the request indicates whether the user wishes to obtain the professional's domestic and/or foreign bankability. It should be appreciated that the request could be filtered by other geographic and revenue types.

After receiving the request, the modeling application 260 identifies all movies associated with the requested professional, as indicated at block 306. According to the illustrated embodiment, the modeling application 260 obtains a list of all movies associated with the professional from the memory device 250. For example, the modeling application 260 accesses the entertainment professional data 252 and obtains the list of movies associated with the requested professional. In some embodiments, for each listed movie, the list indicates the type of association the entertainment professional had with the movie. For example, the list indicates whether the professional was a cast member, director, producer, and/or writer for the movie. According to some embodiments, if a request was to determine the professional's bankability as an actor, director, writer, and/or producer, the modeling application 260 identifies all movies for which the professional had the requested type of association. For example, if the request was for the professional's bankability as an actor, then the modeling application 260 accesses the entertainment professional data 252 and obtains a list of the movies for which the requested professional was an actor.

For each identified movie, the modeling application 260, as indicated at block 322 calculates the requested entertainment professional's audience-interest percentage. According to some embodiments, an entertainment professional's audience-interest percentage for a particular movie indicates the professional's share of the audience interest for the movie relative to the other professionals associated with the movie. Referring now to FIG. 4, this step of calculating the requested entertainment professional's audience-interest percentage for the movie will be discussed in more detail. FIG. 4 provides a flow diagram illustrating an exemplary process 400 whereby the bankability modeling system 200 calculates audience-interest percentages.

As indicated at block 402, the modeling application 260 generally begins by accessing the movie data 256 and obtaining a list of professionals associated with the movie. This list may include all actors, directors, writers, and producers associated with the movie. However, it should be appreciated that the list can be limited to actors, writers, producers, directors, or any combination thereof. For example, if a user requests that the bankability modeling system 200 determine the bankability of a particular entertainment professional as an actor, then the list may be limited to actors that are associated with the movie. Accordingly, it should be appreciated that, if the user specifies that the bankability modeling system 200 determine a particular entertainment professional's bankability as an actor, director, writer, and/or producer, then the modeling application 260 may access the movie data 256 and obtain a list of professionals that have the specified type of association (e.g., actor, director, producer, writer, etc.) with the movie. Further, it should be appreciated that according to other embodiments, even when the user specifies that the bankability modeling system 200 determine a particular entertainment professional's bankability as an actor, director, writer, and/or producer, the modeling application 260 accesses the movie data 256 and obtains a list of all professionals associated with the movie, regardless of their specific type of association. For example, if a user requests that the bankability modeling system 200 determine the bankability of a particular entertainment professional as a director, then the modeling application 260 accesses the movie data 256 and obtains a list of all professionals (e.g., actors, producers, writers, directors) associated with the movie.

After obtaining a list of those professionals associated with the movie, the modeling application 260 accesses the entertainment professional data 252 and obtains the most recent audience-interest value for each of the listed professionals, as represented at block 406. According to some embodiments, the modeling application 260 weights audience-interest values based on professionals' relative popularity. For example, for those professionals that are associated with the movie and that have an audience-interest value in the top one hundred of all professionals across all movies, the modeling application 260 weights those professionals' audience-interest values higher than the audience-interest values of the other listed professionals. This type of weighting prevents the professionals who have relatively low audience-interest values from diluting the audience interest attributable the professional's having relatively high audience-interest values. Similarly, in addition to or instead of weighting audience-interest values of relatively popular professionals, the modeling application 260, according to some embodiments, reduces or eliminates from consideration the audience-interest values of professionals who have relatively low audience-interest values. Next, as represented at block 410, the modeling application 260 aggregates the audience-interest values of all of the listed professionals to determine an aggregated audience-interest value. Then, as represented at block 414, to determine the requested professional's audience-interest percentage for the movie, the modeling application 260 divides the requested professional's audience-interest value by the aggregated audience-interest value of all of the list professionals.

Returning to FIG. 3, after calculating the professional's audience-interest percentage for each movie associated with the professional, the modeling application 260 calculates the professional's revenue share for each movie, at block 326. According to some embodiments, an entertainment professional's revenue share for a particular movie represents the share of the movie's revenue that is attributable to the professional's association with the movie. Referring now to FIG. 5, this step of calculating the professional's revenue share for each movie will be described in more detail. FIG. 5 provides a flow diagram illustrating an exemplary process 500 whereby the bankability modeling system 200 calculates an entertainment professional's revenue share for a movie.

As indicated at block 502, the modeling application 260 of the bankability modeling system 200 generally begins the process 500 by identifying the relevant revenue information in the entertainment professional data 252. For example, if a user requests the bankability determining system 200 to determine a particular entertainment professional's bankability in a particular region (e.g., a country, a region within a country, a region of countries, etc.), then the modeling application 260 accesses the movie data 256 to identify the revenue information relevant to that region. Further for example, if a user requests the bankability determining system 200 to determine a particular entertainment professional's bankability based on a particular type of revenue (e.g., box office, rental, etc.), then the modeling application 260 accesses the movie data 256 to identify the specified type revenue. It should be appreciated that the user may request the professional's bankability based on domestic box-office revenue, foreign box-office revenue, rental revenue, or any combination thereof. For example, if a user requests the bankability determining system 200 to determine a particular entertainment professional's bankability in the United States or in a region of the United States based on box-office revenue, then the modeling application 260, when executing the step indicated at block 502, accesses the movie data 256 to indentify revenue information related to the movie's box-office revenue in the United States or in the specified region of the United States.

Figure 6:
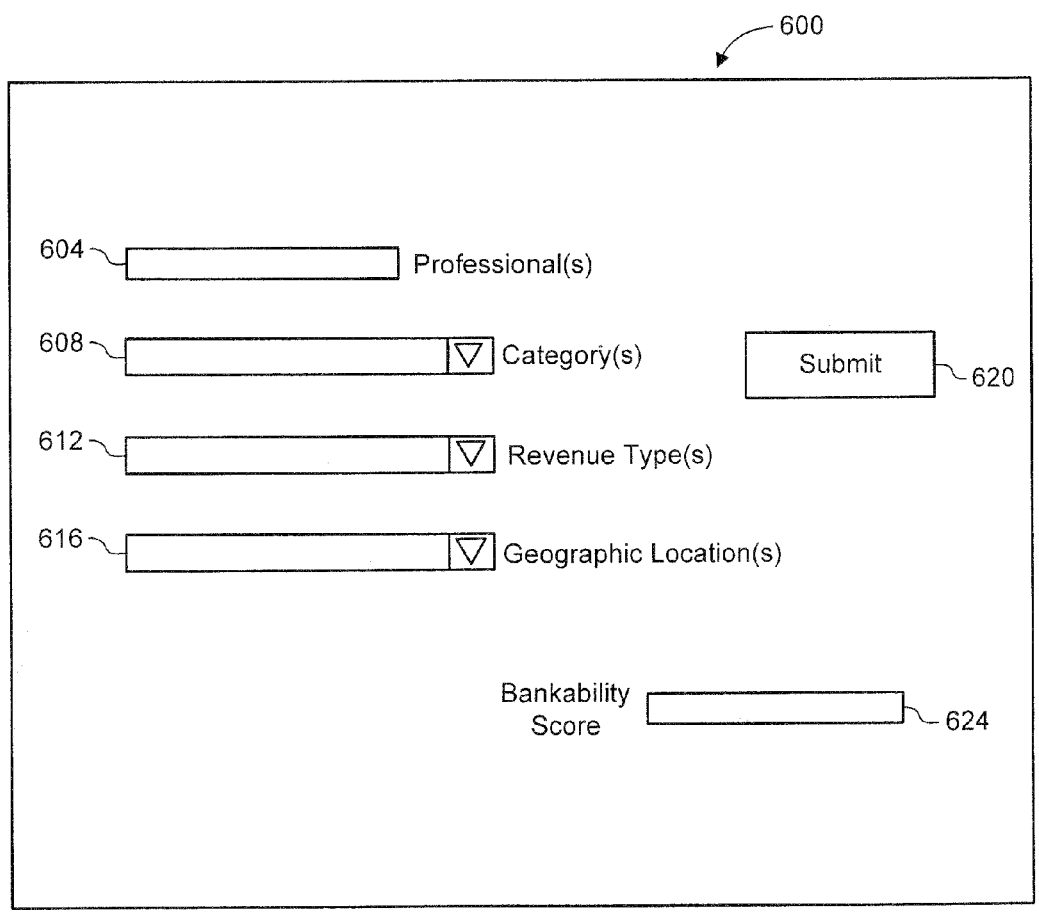
FIG. 6 provides an exemplary user interface, in accordance with at least one emobidment.

FIG. 6 provides an exemplary user interface 600 that, in accordance with one embodiment, is an exemplary illustration of the user interface 220 of FIG. 2. According to the illustrated embodiment, to instruct the bankability modeling system 200 to determine the bankability of a selected professional, a user accesses the user interface 600 and inputs into data field 604 the name or names of the entertainment professionals for whom the user desires a bankability score. According to the illustrated embodiment, the user can filter by category (e.g., actor, musician, performer, director, writer, producer, entity, etc.). This will cause the bankability modeling system 200 to identify the revenue information for the selected professional for a particular category and determine the selected professional's bankability for that category. To do so, the user inputs one or more category descriptions in data field 608. For example, if the user wants to the system 200 to calculate the entertainment professional's bankability as an actor, then the user inputs "actor" into data field 608, causing the modeling application 260 to identify the revenue information relevant to the selected professional as an actor. It should be appreciated that a dropdown menu may be associated with data field 608 and that the dropdown menu provides a list of categories from which the user can select one or more categories.

Further, according to the illustrated embodiment, the user can filter by revenue type by entering one or more revenue types in data field 612 or selecting one or more revenue types from a drop-down menu associated with field 612. For example, if the user wants to the system 200 to calculate the entertainment professional's bankability based on box-office revenue, then the user inputs "box-office revenue" into data field 608 or selects "box-office revenue" from a list of revenue types provided in the associated dropdown menu. In response, the modeling application 260 identifies the box-office revenue related to the selected professional. Also, according to the illustrated embodiment, the user can filter by geographic location by entering one or more geographic locations in data field 616 or selecting one or more geographic locations from a dropdown menu associated with data field 616. For example, if the user wants the system 200 to calculate the entertainment professional's bankability based on revenue from a particular geographic location, such as the Southeastern United States, then the user inputs "Southeastern United States" into data field 616 or selects "Southeastern United States" from a list of geographic locations provided by the associated dropdown menu. In response, the modeling application 260 identifies revenue information relevant to Southeastern United States for the selected professional.

Referring to FIG. 5, after identifying the relevant revenue information, the modeling application 260 accessing the movie data 256 and obtains the identified revenue information, as indicated at block 506. Then, as indicated at block 510, the modeling application 260 aggregates the identified data to determine a total revenue attributed to the movie. For example, if the identified revenue is box-office revenue in the United States and Europe, then, at block 510, the modeling application 260 aggregates box-office revenue in the United States and box-office revenue in Europe to determine the total revenue attributed to the movie. Next, at block 516, the modeling application 260 calculates the requested entertainment professional's revenue share for a particular movie by multiplying the professional's audience-interest percentage (block 322 of FIG. 3) by the total relevant revenue.

Returning again to FIG. 3, after calculating the requested professional's revenue share for a particular movie, the modeling application 260 decays/adjusts the revenue share to account for lapsed time (e.g., time lapsed since the movie was released or since the revenue was posted), as indicated at block 330. Although FIG. 3 illustrates calculating the professional's revenue share and then decaying the revenue share to account for lapsed time, it should be appreciated that the movie's revenue could be time adjusted and then the actor's revenue share can be calculated based on the movie's time-adjusted revenue.

According to some embodiments, the modeling application 260 decays revenue based on the date the revenue was posted. For example, if a movie was released one year prior to determining the actor's revenue share and if the movie's revenue was posted on a weekly basis since the movie's release date, then the modeling application 260 decays each week's revenue according to the date it was posted. For example, the first week's revenue is decayed to account for fifty one weeks of lapsed time, the second week's revenue is decayed to account for fifty weeks of lapsed time, the third week's revenue is adjust to account for forty nine weeks of lapsed time, and so on. It should be appreciated that revenue can be time decayed based on days, weeks, months, or years. Using a time-decayed revenue model in determining an actor's bankability effectively provides more weight for an actor's recent movies.

It should be appreciated that, instead of adjusting revenue based on the date the revenue was posted, revenue could be decayed based on the movie's release date, which could be the domestic release date, the foreign release date, the rental release date, etc. One of ordinary skill in the art will appreciate that there are any number of dates associated with a movie could be used as the relevant date for time adjusting revenue.

After the professional's decayed revenue share has been calculated for each movie associated with the professional, the modeling application 260, as indicated at block 334, aggregates the professional's decayed revenue share for all identified movies to determine the professional's total revenue share. As indicated at block 338, the modeling application 260 normalizes the professional's total revenue share into a bankability score. According to some embodiments, the modeling application 260 normalizes the professional's total revenue share by rank-ordering the professional's total revenue share relative to other professionals' total revenue shares. For example, the professional having the highest total revenue share is assigned a bankability score of "1," the professional having the second highest total revenue share is assigned a bankability score of "2," and so on. It should be appreciated that multiple filters can be applied when rank ordering. For example, a filter can be applied such that only male actors who speak Spanish are rank ordered relative to each other. One of ordinary skill in the art will appreciated that any number and type of filters may be applied to the rank ordering of the professionals' total revenue shares. According to some embodiments, if no filter is applied, the modeling application 260 rank-orders total revenue shares across all types of professionals (e.g., actor, director, producer, etc). Further, according to some embodiments, the modeling application 260 normalizes the professional's total revenue share by grouping the professionals' total revenue shares into tiers. For example, professionals having a total revenue share in the top one hundred are grouped into a first tier, professionals having a total revenue share in the next one hundred are grouped in to a second tier, and so on. As discussed above with respect to rank ordering, it should be appreciated that filters may be applied when grouping professionals into tiers. This normalization enables users, such as filmmakers and casting directors, to use the bankability score to directly compare the bankability of different entertainment professionals. For example, filmmakers can use embodiments described herein to identify which actors have sufficient bankability to attract funding for in-development projects.

Referring to FIG. 6, after the user inputs one or more names of professionals into data field 604, categories into data field 608, revenue types into data field 612, and/or geographic locations into data field 616, the user can then select the submit button 620 and thereby instruct the bankability modeling system 200 to determine a bankability score, which is displayed at 624.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing system, comprising:
   one or more processors; and
   memory including instructions that, when executed by the one or more processors, cause the computing system to:
   receive, by way of a graphical user interface, a selection of an entity for which to calculate a bankability value and a selection of at least one category from a plurality of categories in which the bankability value of the entity is to be calculated;
   identify at least one project of the selected category that is associated with the entity;
   compute an audience interest score for the entity, the audience interest score being based at least in part on network activity associated with the entity;
   compare the audience interest score for the entity to audience interest scores for one or more other entities that are associated with the at least one project; and
   determine a share of revenue of the at least one project that is attributable to the entity based at least in part on comparing the respective audience interest score; and
   compute the bankability value for the entity based at least in part on the share of the revenue for the at least one project attributable to the entity.

2. The computing system of claim 1, wherein the memory further includes instructions that, when executed by the one or more processors, cause the computing system to:
   receive, by way of the user interface, an indication of a revenue type to be used in computing the bankability value; and
   filtering the revenue for the project based at least in part on the revenue type indicated by way of the user interface.

3. The computing system of claim 1, wherein the memory further includes instructions that, when executed by the one or more processors, cause the computing system to:
   receive, by way of the user interface, an indication of a geographic location to be used in computing the bankability value; and
   filtering the revenue for the project based at least in part on the geographic location indicated by way of the user interface.

4. The computing system of claim 1, wherein the plurality of categories include one or more of actor, comedian, musician, performer, director, writer, screenwriter, athlete, business person, and producer.

5. The computing system of claim 1, wherein computing the bankability value further includes:
   determining, for each of a plurality of projects in the category, the share of revenue attributable to the entity; and
   aggregating all of the shares of revenue for the plurality of projects in the category to determine the bankability value for the entity.

6. The computing system of claim 5, wherein computing the bankability value further includes:
   assigning a weight to each of the plurality of projects, the weight based at least in part on time associated with each project.

7. The computing system of claim 1, wherein computing the audience interest score for the entity in the project further includes:
   determining at least one of Internet search queries or page views executed by users related to the entity.

8. A computer implemented method for determining bankability values of entities, the method comprising:
   under the control of one or more computer systems configured with executable instructions,
   receiving, via an interface, an identifier of at least one individual and a selection of at least one category from a plurality of categories;
   identifying one or more projects of the selected category that is associated with the identifier of the individual;
   computing an audience interest score for the individual;
   comparing the audience interest score for the individual to audience interest scores for one or more other individuals that are associated with the one or more projects;

determining a share of revenue for the project attributable to the individual based at least in part on comparing the audience interest score; and computing a bankability value for the individual based at least in part on the share of the revenue for the one or more projects attributable to the individual.

9. The computer implemented method of claim 8, further comprising:

receiving, via the interface, an indication of a revenue type to be used in computing the bankability value; and filtering the revenue for the project based at least in part on the revenue type indicated via the interface.

10. The computer implemented method of claim 8, further comprising:

receiving, via the interface, an indication of a geographic location to be used in computing the bankability value; and filtering the revenue for the project based at least in part on the geographic location indicated via the interface.

11. The computer implemented method of claim 8, wherein the plurality of categories include one or more of actor, comedian, musician, performer, director, writer, screenwriter, athlete, business person, and producer.

12. The computer implemented method of claim 8, wherein computing the bankability value further includes:

determining, for each of a plurality of projects in the category, the share of revenue attributable to the individual; and aggregating all of the shares of revenue for the plurality of projects in the category to determine the bankability value for the individual.

13. The computer implemented method of claim 12, wherein computing the bankability value further includes:

assigning a weight to each of the plurality of projects, the weight based at least in part on time associated with each project.

14. The computer implemented method of claim 8, wherein computing the audience interest score for the individual further includes:

determining at least one of Internet search queries or page views executed by users related to the individual.

15. A non-transitory computer readable storage medium storing one or more sequences of instructions executable by one or more processors to perform a set of operations comprising:

receiving, via an interface, an identifier of at least one entity and a selection of at least one category from a plurality of categories;

identifying one or more projects of the selected category that is associated with the identifier of the entity;

computing an audience interest score for the entity;

comparing the audience interest score for the entity to audience interest scores for one or more other entities that are associated with the project; and determining a share of revenue for the project attributable to the entity based at least in part on comparing the audience interest score; and computing a bankability value for the entity based at least in part on the share of the revenue for the project attributable to the entity.

16. The non-transitory computer readable storage medium of claim 15, further comprising instructions executable by the one or more processors to perform the operations of:

receiving, via the interface, an indication of a revenue type to be used in computing the bankability value; and filtering the revenue for the project based at least in part on the revenue type indicated via the interface.

17. The non-transitory computer readable storage medium of claim 15, further comprising instructions executable by the one or more processors to perform the operations of:

receiving, via the interface, an indication of a geographic location to be used in computing the bankability value; and filtering the revenue for the project based at least in part on the geographic location indicated via the interface.

18. The non-transitory computer readable storage medium of claim 15, wherein the plurality of categories include one or more of actor, comedian, musician, performer, director, writer, screenwriter, athlete, business person, and producer.

19. The non-transitory computer readable storage medium of claim 15, wherein computing the bankability value further includes:

determining, for each of a plurality of projects in the category, the share of revenue attributable to the entity; and aggregating all of the shares of revenue for the plurality of projects in the category to determine the bankability value for the entity.

20. The non-transitory computer readable storage medium of claim 19, wherein computing the bankability value further includes:

assigning a weight to each of the plurality of projects, the weight based at least in part on time associated with each project.

\* \* \* \* \*